Aug. 3, 1926.

A. HARRISON 1,594,726

GAUGE

Filed July 9, 1921   2 Sheets-Sheet 1

Witnesses:
W. F. Kilroy
Harry P. White

Inventor:
Amos Harrison
By Nice & Nice
Attys

Aug. 3, 1926.
A. HARRISON
GAUGE
Filed July 9, 1921
1,594,726
2 Sheets-Sheet 2
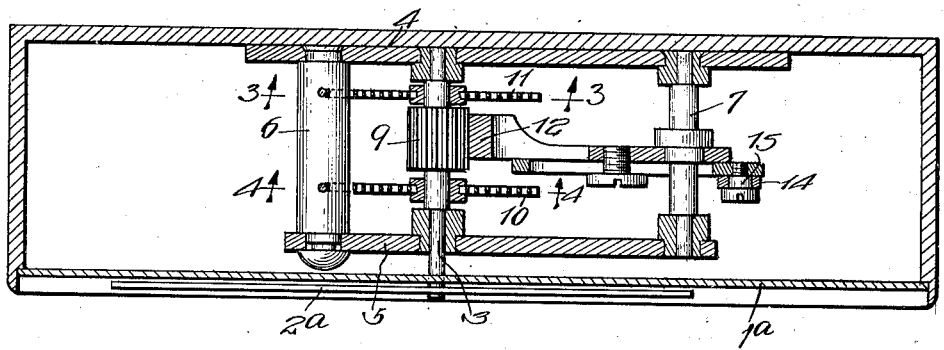
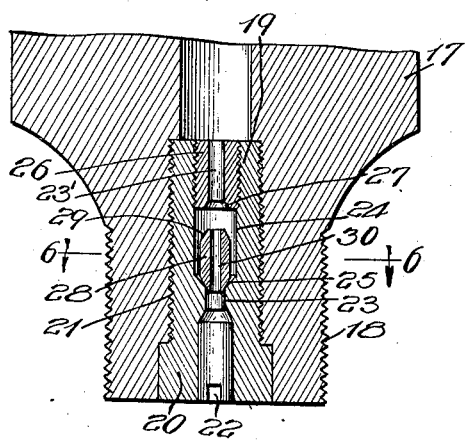
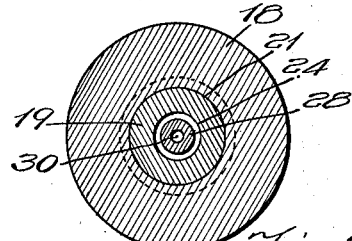
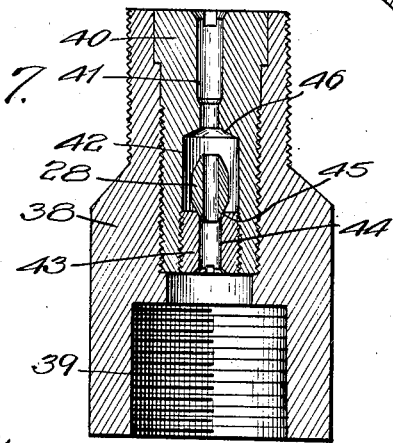
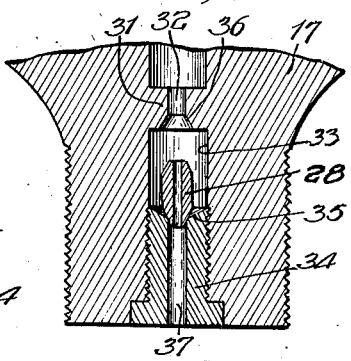
Witnesses:
W. F. Kilroy
Harry P. L. White
Inventor:
Amos Harrison,
By Nice & Nice
Attys Patented Aug. 3, 1926.

1,594,726

UNITED STATES PATENT OFFICE.

AMOS HARRISON, OF CHICAGO, ILLINOIS, ASSIGNOR TO JAS. P. MARSH & COMPANY, OF CHICAGO, ILLINOIS, A CORPORATION OF ILLINOIS.

GAUGE.

Application filed July 9, 1921. Serial No. 483,519.

My invention relates to improvements in gauges, and more particularly to means for stabilizing the movement of the pressure-indicating means so that sudden changes of pressure will not strain, twist or injure the indicator spindle or the indicator pointer, spring or other parts to damage them.

One of the objects of my invention is to provide a double hair spring, operatively connected to the pointer spindle, each of said springs being reversely wound so that they mutually cooperate with each other in their action upon the spindle to hold the pointer properly steady.

Another object of my invention is to provide a check valve at the inlet to the gauge spring, a Bourdon tube being shown, whereby the passage through the inlet duct is restricted when there is any sudden change of pressure acting in said inlet, thereby preventing said pressure from suddenly acting upon the indicator control mechanism.

The invention has among its other objects the production of a device of the kind described which will prevent injury to the gauge and prolong its life, and which at all times will enable the gauge to show a true and accurate pressure indication.

Further objects of my invention are the production of a device of the kind described which is simple and reliable, efficient and satisfactory for use wherever found applicable.

To this end my invention consists in the novel construction, arrangement and combination of parts herein shown and described, and more particularly pointed out in the claims.

In the drawings, wherein like reference characters indicate like or corresponding parts, Fig. 1 is a plan view of my invention with the dial, pointer and glass front of the gauge broken away;

Fig. 2 is a section taken substantially on the line 2—2 of Fig. 1;

Fig. 5 is a sectional view taken on the line 5—5 of Fig. 1;

Fig. 6 is a sectional view taken on the line 6—6 of Fig. 5;

Fig. 7 is a sectional view similar to that shown in Fig. 5, representing a modified form;

Fig. 8 is a section similar to that shown in Fig. 5, representing another modification.

Figure 1:
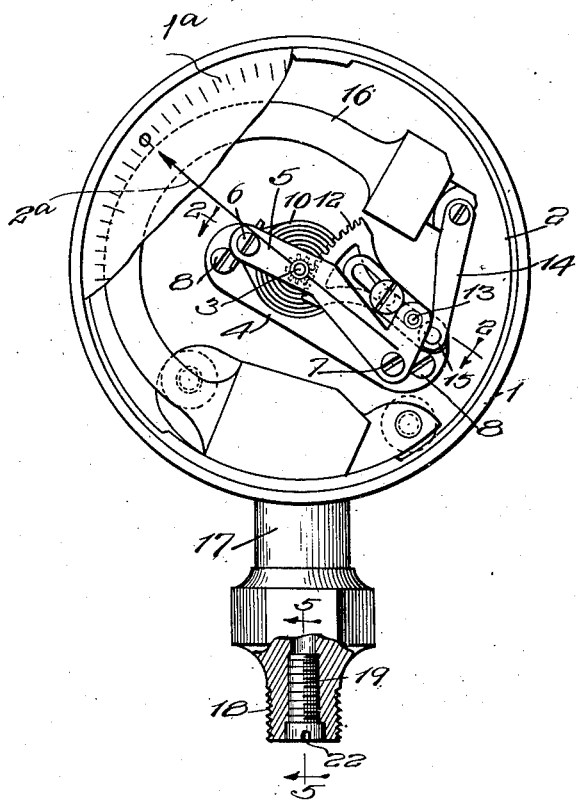

Referring to the drawings, wherein I have illustrated the preferred embodiment of my invention, 1 represents a suitable casing of a gauge provided with a fixed dial 1ª over the front of which may be arranged a glass-face or the like (not shown), said casing being preferably annular and having a rear wall 2. The gauge shown may be arranged for indicating either pressure or vacuum in any desired increments, depending upon the use for which the gauge is designed.

Figure 3:
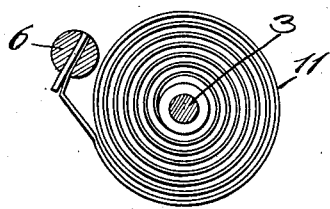
Fig. 3 is a section taken substantially on the line 3—3 of Fig. 2.
Figure 4:
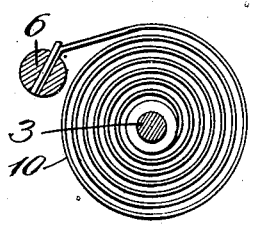
Fig. 4 is a section taken substantially on the line 4—4 of Fig. 2.

Movable over the face of the dial 1ª is an indicator or pointer 2ª, which is mounted on a spindle 3, said spindle being mounted between spaced plates 4 and 5, said plates being secured to the back of the casing by means of screws 8 or the like and spaced apart by posts 6 and 7. The spindle 3, which carries a pinion 9 intermediate its ends, has a pair of oppositely wound coil springs 10 and 11 secured thereto, one end of each of said coil springs being secured to one of the posts, as for instance the post 6, and the other end of each of said springs being secured to the spindle. It will be noted, by referring to Figs. 1, 3 and 4, that as the spindle is rotated in one direction or the other the springs 10 and 11 substantially cooperate to return the spindle to the normal or zero position, one spring being wound up and the other unwound. This affords a steadying of the mechanism, so that the indicator moves smoothly and does not vibrate to any considerable extent. A gear segment 12, pivotally secured at 13, meshes with the pinion 9, said gear segment being adjustable in length and having a link 14 pivotally secured thereto at one end at the point 15, said link 14 having its other end pivotally secured to the end of the gauge spring 16, or the equivalent.

At the end of the gauge spring 16 there is the usual extension 17 through the casing 1, whereby the pressure from any suitable device to be measured may be connected up with the spring or tube. The outer end of the extension 17 is usually externally threaded, as at 18. In order to prevent sudden changes of pressure from being immediately transmitted past the inlet of the tube to the spindle, I have provided a stabilizer or check means 19. said stabilizer in Figs. 1 to 6 inclusive comprising a plug 20 having its exterior screw-threaded at 21 so as to engage within the cooperating threads at the inlet duct of the extension 17, the outer end of said plug 20 having a kerf or the like 22 therein, whereby said plug may be engaged by a screw driver, or any other equivalent tool, for its insertion into the inlet extension 17. The plug 20 is preferably hollow and has a bore 23 therethrough, said bore being preferably enlarged to form a chamber 24, having a valve seat 25 at one end thereof. A closure insert 26 is adapted to be secured in said plug at one end thereof, as shown in Fig. 5, said closure having a duct 23′ therethrough, with a valve seat 27 at the inner end of the plug, said ducts 23 and 23′ being in alignment so that the valve seats 25 and 27 are opposite one another at the opposite ends of the valve chamber 24.

Arranged within the valve chamber 24 is a check valve 28, said check valve being preferably elongated and having cooperating valve-engaging surfaces 29 at the opposite ends thereof, said valve being of a lesser diameter and length than that of the valve chamber 24 and having a bore 30 therethrough of a lesser diameter than that of the aligned bores 23 and 23′. It will be apparent from the drawings that, as the pressure suddenly changes, the check valve 28 will be forced against either of the valve seats 25, 27, depending in which direction the excess pressure is being transmitted at the time. Under normal conditions the fluid can pass through the tubular valve and around the same, the valve, if necessary, substantially floating in the chamber so that, when required, a full-sized passage is available. Assuming that the check valve is in the position shown in Fig. 5, then a sudden increase of pressure will force the check valve upwardly so that the portion 29 engages against the valve seat 27, whereupon the pressure-transmitting medium must flow past the duct 23′ to act on the spring or tube through the restricted passage 30, this restriction causing a retarding of the movement of the spring. Any sudden back flash is also overcome and allows the spring 16 to settle back slowly and indicate a true pressure on the reacting or lowering of the pressure therein. From the preceding it will be seen that the stabilizer or valve mechanism prevents sudden increases or decreases in pressure from acting immediately on the gauge mechanism, thereby preventing strain on the parts, with possible injury to the mechanism. The check valve 28 operates in conjunction with the opposed hair springs 10 and 11 to doubly insure that the pointer will not act in a jerky manner to indicate a false reading.

In the modification shown in Fig. 8, the extension 17 has an integral web 31 thereacross near the inlet thereto, with a bore 32 therethrough, said bore being enlarged to form a chamber 33 near the outer portion thereof. A plug 34 is adapted to be inserted into the enlarged bore 33, said plug having a valve seat 35 on the inner face thereof adapted to cooperate with the check valve 28, the bore 32 being also provided with a valve seat 36 in alignment with said valve seat 35. The plug 34 is bored axially thereof, as at 37, the bores 32 and 37 being larger than the bore through the check valve 28 in the same manner and for the same purpose as that previously described.

In the modification shown in Fig. 7, the part 38 is adapted to be used for connection to the ordinary gauge, said part having a threaded socket 39 thereon adapted to engage the screw threads 18 at the free end of the extension 17 of the gauge. A plug 40 is adapted to be inserted in the part 38 similar to the insertion of the plug 20 in the part 17, said plug 40 having a bore 41 therethrough enlarged to form a chamber 42. A closure member 43 is positioned in said enlarged chamber 42 at one end thereof, said closure member 43 having a bore 44 therethrough with a valve seat 45 at the inner end thereof, said valve seat being in alignment with and adapted to cooperate with the valve seat 46 at the inner end of the bore 41, there being a check valve 28 arranged within said valve chamber and adapted to operate therein in the same manner as that previously described. The construction is the same except the extra casing is provided.

The opposed hair springs and the stabilizer check valve may be used in any type of gauge for any service where pressures or vacuums are desired, as, for instance, with steam, water, air, gas, ammonia or with any other chemical fluids.

Having thus described my invention, it is obvious that various immaterial modifications may be made in the same without departing from the spirit of my invenion; hence I do not wish to be understood as limiting myself to the exact form, construction, arrangement and combination of parts herein shown and described or uses mentioned.

What I claim as new and desire to secure by Letters Patent is:

1. In a gauge, indicating mechanism including a rotatable member, a pressure-controlled spring means, means operatively connecting said spring means and indicating mechanism, and a pair of oppositely coiled springs each connected to a fixed part and to said rotatable member of the indicating mechanism for steadying the movement thereof.

2. In a gauge, a spindle, an indicator carried thereby, a pressure-controlled tubular spring, means whereby said spring is operatively connected to said spindle to control the movement of said indicator, and a pair of oppositely coiled spiral springs each connected to a fixed part and to said spindle and acting in relatively opposite directions thereon to steady the movement thereof.

3. In a gauge, indicating mechanism, a hollow pressure-controlled spring operatively connected therewith, said spring having an inlet at one end, a valve chamber at said inlet having a valve seat at one end thereof, a check valve slidable in said chamber and having a duct therethrough smaller than said inlet, whereby a sudden increase of pressure will move said valve against said valve seat to restrict the flow through said inlet.

4. In a gauge, indicating mechanism, a hollow pressure-controlled spring operatively connected therewith, said spring having an inlet at one end, a valve chamber at said inlet having valve seats at both its ends, a check valve slidable in said chamber and having a bore smaller than that through said inlet and said chamber being of a larger diameter than said valve, whereby a sudden increase of pressure in either direction will move said valve against one of the valve seats to restrict the flow through said inlet.

5. In a gauge, a spindle, an indicator carried thereby, a pressure controlled tubular spring, means whereby said spring is operatively connected to said spindle, a pair of oppositely coiled springs each connected to a fixed part and to said spindle and acting in relatively opposite directions thereon, in combination with a stabilizer at the inlet to said tubular spring to restrict the flow through said inlet upon sudden change of pressure therethrough.

In testimony whereof, I have hereunto signed my name.

AMOS HARRISON.